Dec. 29, 1925.

C. HAPP 1,567,436

ELECTRICAL FAN

Filed April 5, 1924

Conrad Happ, Inventor.
By Emil Neubash
Attorney.

Witness
J.J. Oberst.

Dec. 29, 1925.

C. HAPP

ELECTRICAL FAN

Filed April 5, 1924

Conrad Happ, Inventor.

By Emil Kunkach

Attorney

Witness:
J. J. Oberst,

Patented Dec. 29, 1925.

1,567,436

UNITED STATES PATENT OFFICE.

CONRAD HAPP, OF BUFFALO, NEW YORK.

ELECTRICAL FAN.

Application filed April 5, 1924. Serial No. 704,390.

*To all whom it may concern:*

Be it known that I, CONRAD HAPP, a citizen of the United States, residing at Buffalo, in the county of Erie and State of New York, have invented certain new and useful Improvements in Electrical Fans, of which the following is a specification.

My invention relates to improvements in electric fans.

One of the objects of my invention is to provide an electric fan which is compact, light in weight, and capable of being easily and quickly attached to any incandescent lamp socket or other connector; it being especially designed for the traveling public, owing to the fact that its size and weight will permit it to be conveniently carried with other articles within a traveling bag or case.

Another object of my invention is the provision of an improved fan arranged to rotate on its own axis and to travel orbitally so that a column of air may be propelled to all parts of a room.

Other objects are to provide a motor with an adapter capable of being secured or connected to a source of electrical energy through the medium of a receiving socket or other connector adapted for connection therewith; and to provide a non-rotatable motor having an adjustable fan fastened to another point thereof through the medium of a rotatable element driven by the motor so as to cause the fan and its shaft to rotate orbitally when adjusted at an angle to the axis of said motor.

With the above and other objects in view, the invention consists in the novel features of construction and in the arrangement and combination of parts to be hereinafter described and more particularly pointed out in the subjoined claims.

In the drawings:—

Figure 1:
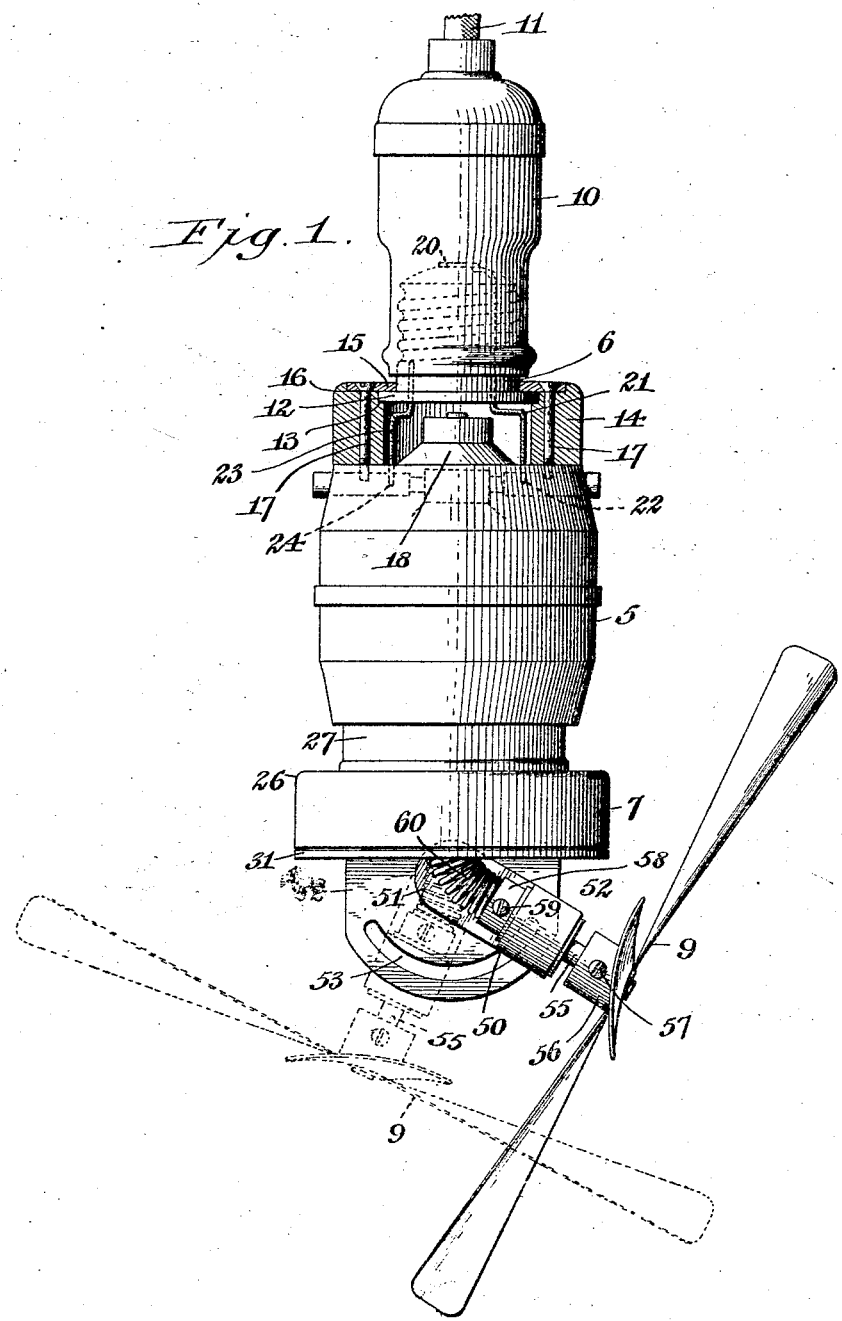
Fig. 1 is a sectional elevation of an electric fan constructed in accordance with my invention, the section being taken through the means employed for connecting the motor to the threaded plug or other adapter by means of which connection is made with a source of electrical energy.
Figure 2:
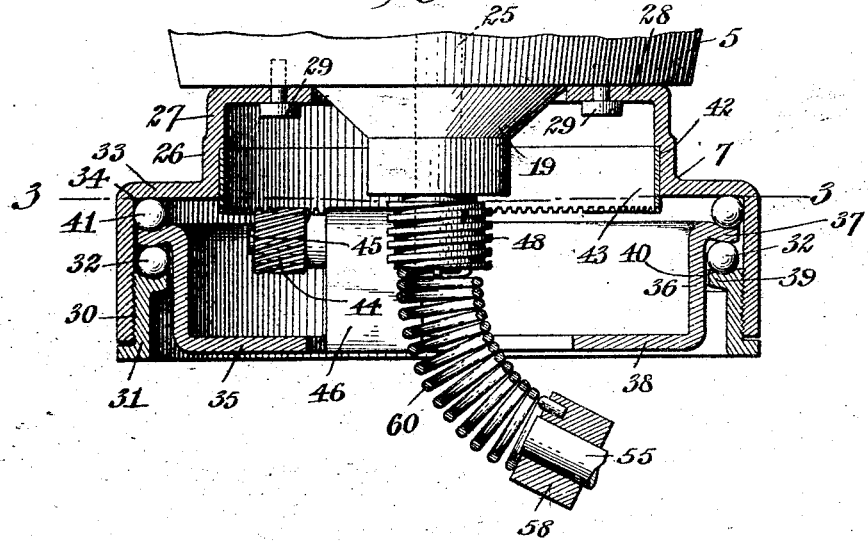
Fig. 2 is an enlarged sectional elevation of the lower portion of the motor and that part of the device connected thereto.
Figure 3:
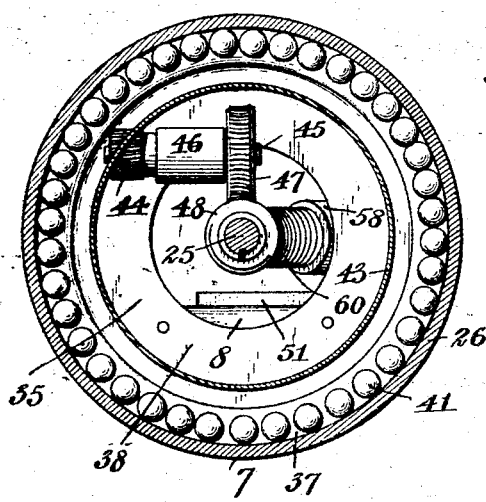
Fig. 3 is a horizontal section taken on line 3—3, Fig. 2.
Figure 4:
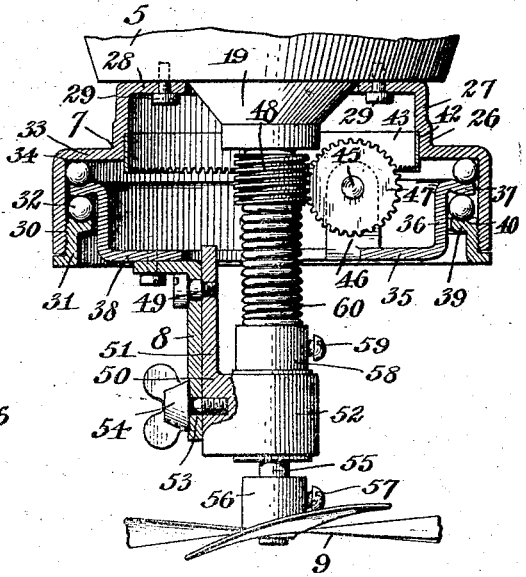
Fig. 4 is a sectional elevation through the lower portion of the device showing the fan co-axial with the motor and showing the manner of connecting the fan to the shaft of the motor and supporting said fan from the rotatable element carried by the motor.

By means of my invention the usual connecting cord between the fan and the socket or other part with which the fan is electrically connected is dispensed with. In this invention the fan is supported from a non-rotatable motor and the motor has an adapter secured thereto in the form of a screw plug; or it is otherwise adapted for connection with an electrical fixture to which a source of electrical energy is connected.

In preferred form the device comprises a motor 5, which I preferably refer to as a non-rotatable motor in contradistinction to the rotatable motor of my co-pending application filed June 20, 1923, Serial No. 646,-569; a screw plug 6 or other connector or adapter secured to the upper end of said motor; a supporting member 7 secured to the lower end of said motor and including non-rotatable parts and a rotatable part carried by and arranged within said non-rotatable part; a bracket 8 carried by said rotatable part; and a fan 9 having its shaft adjustably and flexibly connected with the shaft of said motor.

In using the term "non-rotatable" in connection with the motor, I mean that the motor is not bodily rotatable, but it is understood that parts within the shell or casing of the motor are necessarily rotatable in order to rotate the fan.

The screw plug or adapter 6 is threaded into a lamp socket 10 fastened to the lower end of an electric current conducting cord 11, but it is to be understood that the plug or other adapter may be connected to any other suitable electric fixture or element. As clearly shown in Fig. 1 of the drawings, the screw plug 6 has a flange 12 at its lower end which is seated into a circular rabbet 13 formed in a non-insulating annulus 14, and said flange 12 is retained and preferably clamped in the rabbeted portion of said annulus by a retainer ring 15 fitted into the recessed upper end 16 of said annulus, the inner marginal portion of said retainer ring bearing against the upper face of said flange. Screws 17 are passed through alined screw holes in said retainer ring and annulus and thread into the upper end of the motor casing, thus securely fastening the annulus and retainer ring to said motor; at the same time said screws assure retention of the flange 12 of said plug within the annulus in a manner to prevent rotation of said plug, thus permitting a quick and ready connection of the device to the lamp socket 10.

The particular motor shown has axial extensions 18, 19, the extension 18 being at the upper end thereof and positioned within the annulus 14.

As is common in connector plugs of the kind shown in the drawings, said plug has a center contact 20 from which a wire 21 leads and is connected with one of the brushes of the motor, as at 22. Said plug also has a wire 23 connected to the exterior contact element thereof, and this wire leads to the other brush of the motor, as at 24. Therefore, when the key (not shown) of the socket 10 is turned to establish an electric circuit, the current passes through the motor and causes rotation of the rotor secured to the motor shaft 25 extending axially through the motor.

The support 7 comprises a casing 26 which is preferably of cylindrical formation in cross section, and has its upper portion reduced in diameter, as in 27, said reduced upper end having an inwardly-directed flange 28 bearing against the lower end of the motor casing. Securing screws 29 are passed through said flange and take into the motor casing. The support-casing 26 has its large lower end internally threaded, as at 30, and receives the externally threaded retainer ring 31. Said retainer ring serves as a half ball raceway and has an annular series of anti-friction balls 32 resting thereon. By reason of the support-casing 26 being reduced at its upper end, the enlarged lower portion is connected to the reduced upper portion by a horizontal wall 33 forming an internal angle 34 between said horizontal wall and the peripheral wall of the enlarged lower portion.

Arranged within the enlarged lower portion of said support-casing is a rotatable member or element 35, which has a peripheral or annular wall 36 provided at its upper end with an outwardly-directed flange 37 and at its lower end with an inwardly-directed flange 38. The outwardly-directed flange 37 bears against the annular series of anti-friction balls 32 and it is made preferably concavo-convex in formation with the convexity at its under side and its concavity at its upper side. The upper end of the retainer ring 31 is preferably provided with an inwardly-directed flange 39 so as to provide a comparatively wide upper surface, and this upper surface is preferably formed with a concaved groove 40 to receive the annular series of anti-friction balls 32. The convex under side of the outwardly-directed flange 37 of said rotatable member 35 travels in contact with the circular series of balls 32 while the concaved upper side of said flange 37 receives a second annular series of anti-friction balls 41 which fit into the angle 34 of the support-casing and bear against the under side of the horizontal wall 33 and the inner surface of the annular wall of the enlarged lower portion of said support-casing.

The retainer ring 31 is adjustably retained within the enlarged lower portion of the support-casing and forces the lower series of anti-friction balls against the outwardly-directed flange 37 of the rotatable member 35 with proper pressure and also through the medium of said series of balls 32 and said flange 37 presses the upper series of anti-friction balls 41 with proper pressure against the under side of the horizontal wall 33 and the inner surface of the annular wall of the lower portion of said support-casing with proper pressure to assure free rotation of said rotatable member 35, while preventing noise between such parts.

The interior of the upper reduced portion of said support-casing is enlarged around its lower region to form an annular recess 42 in which is fitted a gear ring 43 having its teeth around its lower edge and with which a mitre gear 44 meshes, said mitre gear being secured to a shaft 45 journaled in a bracket 46 supported by the rotatable member 35. Said shaft 45 is tangentially disposed and at its inner end has a worm gear 47, which is in mesh with a worm 48 secured to the lower end of the motor shaft 25.

Secured to the under side of the inwardly-directed flange 38 forming part of the rotatable member 35 is the bracket 8, or fan support, as it may be termed, which is positioned off center, and pivotally secured to said bracket, as at 49, is an adjustable bearing 50 which comprises an arm 51 and a bearing member 52 at the lower end of said arm. The arm 51 lies in contact with the bracket and is retained thereagainst by means of the pivot 49, and said bracket has a segmental slot 53 through which a thumb screw 54 is passed that takes into the bearing member 52 of said adjustable bearing. By reason of the pivotal connection of said adjustable bearing with the bracket 8 and the passage of the thumb screw 54 through the segmental slot 53, the bearing may be alined with the shaft of the motor so as to bring the axis of said bearing member 52 coincident with the axis of the motor shaft, or said adjustable bearing may be positioned and fastened at an angle to the axis of the motor, either to one or the other side thereof, as may be desired.

Rotatable in the bearing member 52 is the shaft 55 of the fan 9, said fan having a hub 56 and a set screw 57 passed through said hub and bearing against said shaft 55 to securely fasten the fan thereto. A collar 58 is fastened to the inner end of the fan shaft, by means of a set screw 59, and this collar bears against the upper end of the bearing member 52.

Connecting the collar 58 with the lower end of the motor shaft, or with the worm secured to said shaft, is a flexible shaft 60 in the form of a helical spring having its upper end fastened to the lower end of said motor shaft or to the worm gear secured to said motor shaft, in any approved manner, and its lower end similarly fastened to the upper end of the collar 58 secured to the fan shaft.

It will be apparent that it is a simple matter to remove the fan from its shaft, and when this is done, the device can be easily placed within a traveling bag or case, as neither the fan nor the part of the device from which the fan is detached will occupy much space, and owing to the size of the device it is comparatively light in weight.

When it is desired to use the device, it is an easy matter to secure the fan to the fan shaft, and adjust the bearing 50 to the desired position; either with the axis of the fan coincident with that of the motor, or with the axis of said fan at any desired angle to the axis of the motor, either to the right or left of the center, as shown in Fig. 1. The device will then be complete for use and it is only necessary to thread the plug 6 into a lamp socket. Upon supplying current to the lamp socket, an electrical circuit is established, including the wires 21 and 23. This will cause the rotor and shaft of the motor to rotate, while the casing of the motor remains in fixed or non-rotatable position. Owing to the fact that the supporting member or support-casing is secured to the lower end of the motor casing, said supporting member or support-casing remains non-rotatable, although it has arranged within it the rotatable member 35 which carries the worm gear 47 and the mitre gear 44, and owing to the fact that the worm gear 47 is in mesh with the worm 48 fastened to the lower end of the motor shaft and both the worm gear and the mitre gear are secured to the same shaft, said mitre gear is caused to rotate, with the result that it travels around the toothed lower edge of the gear ring 43 non-rotatably retained within the supporting member or support-casing. This results in member 35 being rotated, which it is free to do, owing to the fact that its outwardly-directed flange 37 is retained between the two annular series of anti-friction balls 32 and 41 and is otherwise out of contact with all other parts of the supporting member.

By reason of the fact that the shaft 45 is journaled in the bracket 46 carried by the rotatable member 35, the bracket 8 to which the adjustable bearing 50 of the fan shaft is pivotally secured, rotates orbitally or in a circular path around an extended axis of the motor shaft.

When the fan shaft is adjusted so that its axis is coincident with that of the motor shaft, the bracket 8 will rotate orbitally, but will not in any manner change the direction of the axis of said fan shaft. In fact, the fan shaft will rotate at a high speed within the bearing member 52 of said adjustable bearing while the bearing member itself will rotate around said fan shaft. When, however, the fan shaft is adjusted so as to assume a position at an angle to that of the motor shaft, said fan shaft will rotate on its own axis, causing the desired swift rotation of the fan, and said fan shaft will also travel orbitally but in a comparatively slow manner, for the reason that the mitre gear 44 travels slowly around the gear ring, owing to the gear connection between the fan shaft and the shaft having the mitre gear secured thereto. For this reason columns of air are directed to all parts of a room when the fan shaft is disposed at an angle to the motor shaft, and the area or sweep of air currents is increased in proportion to the increase in the angularity of said fan shaft.

The device illustrated and described is exceedingly simple, comparatively small, and light in weight, and as it comprises a motor of common construction, a screw plug of common construction connected with the fields of said motor, and as the fan and fan shaft are connected by simple means with the shaft of the motor and are supported by a supporting member capable of being stamped out of sheet material, the device is also comparatively inexpensive.

Having thus described my invention, what I claim is:—

1. A device of the kind described having a nonrotatable motor, a connector on said motor for connection with a source of electrical energy, a fan adjustably connected with said motor, a support for said fan supported from the lower end of said motor, and means actuated by said motor for orbitally moving said fan.

2. A device of the kind described having means of connection to a lamp socket, a motor electrically connected to said means of connection and rigidly supporting the same when connected to a lamp socket, a fan operatively connected with said motor and adjustable along an arc of a circle to permit said fan to be positioned co-axially with said motor or at an angle thereto, and means actuated by said motor for orbitally moving said fan.

3. A device of the kind described having a screw plug for connection with a lamp socket, a motor having a non-rotatable casing and a rotor therein, fixed connection between said motor casing and said screw plug, a supporting member secured to said motor casing and having a rotatable element therein, a fan, a fan shaft to which said fan is connected and which has connection with said rotor, and a bearing for said fan shaft adjustably supported from said rotatable element.

4. A device of the kind described having means of connection to a lamp socket or the like, a motor having a shaft and being rigidly connected with said means of connection, a supporting member secured to the lower end of said motor and having a rotatable element therein, a bracket depending from said rotatable element, a bearing member pivotally secured to said bracket to move along an arc of a circle, a fan shaft journaled in said bearing member, a fan on said fan shaft, flexible connection between said fan shaft and the shaft of said motor, and means for orbitally rotating said fan from said motor.

5. A device of the kind described, comprising a motor having a non-rotatable casing and a rotor within said casing, a screw plug secured to one end of said motor casing, a fan flexibly connected with said rotor so as to rotate upon its own axis and be adjustable with respect to the axis of said rotor, and means driven by said motor and interposed between said rotor and fan independent of the flexible connection therebetween for causing said fan to travel orbitally.

6. A device of the kind described, comprising a motor having a non-rotatable casing, a rotor within said casing, a shaft to which said rotor is secured, means of connection to a lamp socket or the like at one end of said motor casing, a supporting member secured to the other end of said motor casing including a rotatable element, means for rotating said element from the shaft of said motor, a fan having a fan shaft flexibly connected with said motor shaft, and a bearing pivotally supported from said rotatable member and having the fan shaft journaled therein.

7. In a device of the kind described, a motor having a non-rotatable casing, a rotor within said casing and a shaft to which said rotor is secured, means of connection to a source of electrical energy carried at one end of said motor casing, a supporting member secured to the other end of said motor casing and having a rotatable element therein, means for rotating said element from said motor shaft, a fan, a fan shaft to which said fan is secured, a bearing adjustably supported from said rotatable element and having said fan shaft journaled therein, and flexible connection between said fan shaft and said motor shaft.

8. In a device of the kind described, a motor having a non-rotatable casing, a rotor within said casing and a shaft to which said rotor is secured, a fan connected to said shaft and rotated on its own axis and around a circular path by said motor, and means of connection with a source of electric energy carried by said motor casing and non-rotatably fastened thereto.

9. A device of the kind described, comprising a motor having a non-rotatable casing, a rotor within said casing and a shaft to which said rotor is secured, an annulus applied to one end of said motor casing, a lamp socket plug, means for fastening said lamp socket plug to said annulus and said annulus to said motor casing, a fan flexibly connected with said motor, means for adjusting said fan to position the same at an angle to said motor, and means to cause said fan to travel in a circular path while rotating on its own axis.

10. A device of the kind described, comprising a plug adapted for connection to a lamp socket, a motor non-rotatably supported by said plug and having a motor shaft, a rotatable element supported from said motor and having a bracket extending outwardly therefrom, a bearing having an arm pivotally secured to said bracket, means for adjusting said bearing on said bracket along an arc of a circle, a fan shaft journaled in said bearing flexibly connected with the shaft of said motor, and a fan secured to said fan shaft.

11. A device of the kind described, comprising as a unitary structure a motor, means for rigidly supporting said motor from a lamp socket or the like, a fan driven by said motor and adjustably supported therefrom to position said fan with its axis coincident with that of the motor or at an angle thereto, and means driven by said motor for causing said fan to move orbitally when at an angle to the axis of said motor.

12. A device of the kind described, comprising as a unitary structure, a non-rotatable motor, means for rigidly connecting said motor to a lamp socket or the like, a supporting element rotatably secured to said non-rotatable motor, a fan shaft carried by said supporting element and adjustable to position the same co-axial with the shaft of said motor or at an angle thereto, a fan secured to said shaft, and means to cause said fan to move orbitally when positioned at an angle to the shaft of said motor.

13. A device of the kind described, comprising as a unitary structure, a non-rotatable motor, means for rigidly connecting said motor to a lamp socket or the like, a fan, and means operated from said motor for causing said fan to rotate on its own axis and to travel orbitally while so rotating.

14. A device of the kind described, comprising a non-rotatable motor having a motor casing, a rotor therein and a shaft to which said rotor is secured, an annulus secured to one end of said motor casing, a retainer ring secured to said annulus, a plug having a flange positioned between said annulus and retainer ring and adapted for connection to a lamp socket, electrical connection between said plug and rotor to cause the same to rotate, a supporting member having a rotatable element therein, a fan shaft, a bearing for said fan shaft adjusted to move in an arc of a circle and carried by said rotatable element, means for rotating said fan shaft from said motor shaft, and a fan secured to the outer end of said fan shaft.

15. A device of the kind described, comprising a non-rotatable motor having a shaft and means at one end for rigidly connecting said motor with a lamp socket or the like, a supporting member secured to the other end of said motor including an annular gear and a rotatable element therein, a shaft journaled on said rotatable element, a gear on said shaft meshing with said annualar gear, a worm gear on said shaft, a worm on the shaft of said motor meshing with said worm gear, a bracket arranged off center and extending outwardly from said rotatable element, said bracket having a segmental slot therein, a fan shaft, a bearing in which said fan shaft is mounted having an arm pivotally secured to said bracket, a thumb screw passed through the segmental slot of said bracket and threaded into said bearing, flexible connection between said motor shaft and said fan shaft, and a fan connected to said fan shaft.

16. In a device of the kind described, a non-rotatable motor having a motor shaft, means of connection at one end of said motor with a source of electrical energy, a supporting member secured to the other end of said motor and having a cylindrical upper end and an enlarged cylindrical lower end internally threaded, a gear ring fitted in the cylindrical upper end of said supporting member, a retainer ring threaded into the threaded lower end of said supporting member, a rotatable element within said supporting member and forming part thereof, said rotatable element having an outstanding flange, a series of anti-friction balls between said retainer ring and said outstanding flange, operative connection between the shaft of said motor and said gear ring to cause said rotatable member to rotate, a fan shaft adjustably supported from said retainer member to position the same co-axial with said motor shaft or at an angle thereto, flexible connection between said fan shaft and said motor shaft, and a fan secured to the outer end of said fan shaft.

17. A device of the kind described, comprising a non-rotatable motor having a motor shaft, means for rigidly connecting said motor to a lamp socket or the like, fan supporting means connected to said motor and including a non-rotatable part, a rotatable part within said non-rotatable part, a retainer ring fastened into the lower end of said non-rotatable part and a series of anti-friction balls between said rotatable part and said non-rotatable part and also between said rotatable part and said retainer ring, an annular gear carried by said non-rotatable part, means driven from the shaft of said motor including a gear meshing with said gear ring for causing rotation of said rotatable part, a fan shaft, a journal for said fan shaft adjustably connected to said rotatable part for swinging said fan shaft at an angle to said motor shaft or in line therewith, flexible connection between said motor shaft and said fan shaft, and a fan connected to the outer end of said fan shaft.

18. A device of the kind described, comprising a non-rotatable motor having a motor shaft, means for rigidly connecting said motor to a lamp socket or the like, a cylindrical support casing having its lower end of larger diameter than its upper to form an internal angle, a retainer element fitted into the lower end of said casing, a rotatable element within said casing provided with an annular flange, an annular series of anti-friction elements between said flange and said internal angle, a second series of anti-friction elements between said flange and said retainer element, a shaft journaled on said rotatable element, a worm gear on said shaft, a mitre gear also on said shaft, a gear ring non-rotatably carried by said support casing and having said mitre gear in mesh therewith, a worm on said motor shaft in mesh with said worm gear, a bracket extending outwardly from said rotatable element, a shaft bearing having an arm pivotally secured to said bracket and being adjustable laterally thereon, a fan shaft journaled in said bearing and having flexible connection with said motor shaft, and a fan secured to said fan shaft.

In testimony whereof I affix my signature.

CONRAD HAPP.